Dec. 18, 1934.  E. E. WEMP  1,985,126
DRIVING MECHANISM
Filed Nov. 5, 1931   3 Sheets-Sheet 2
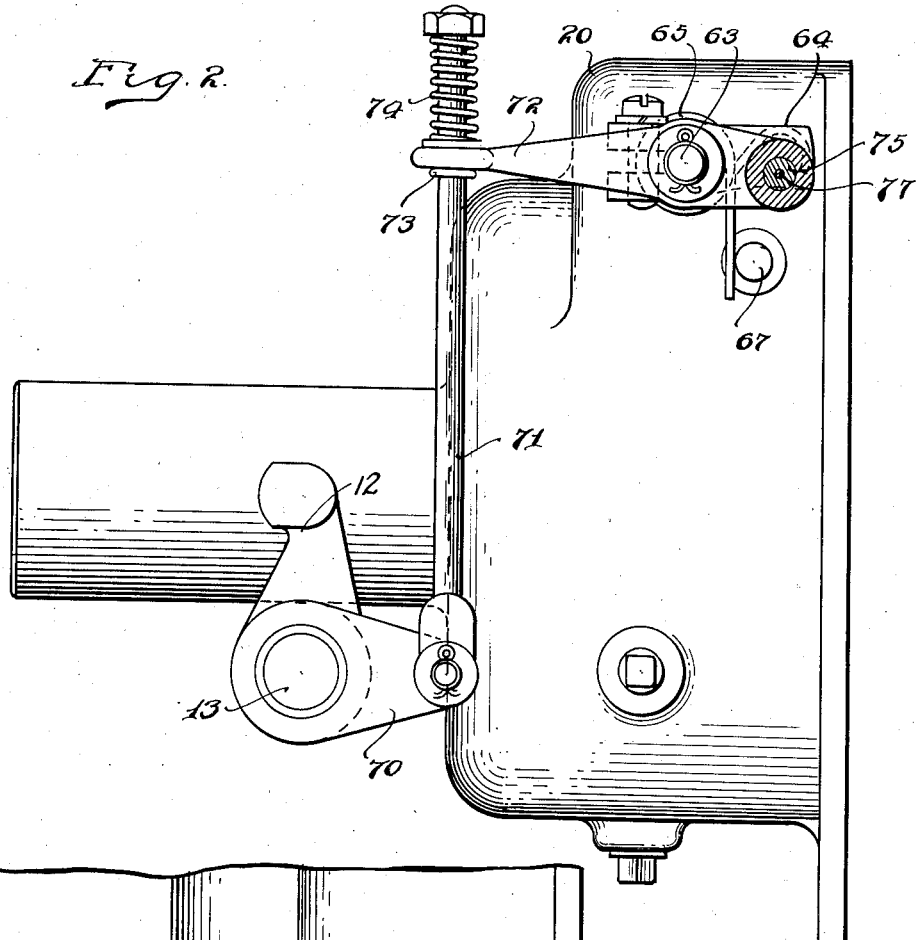
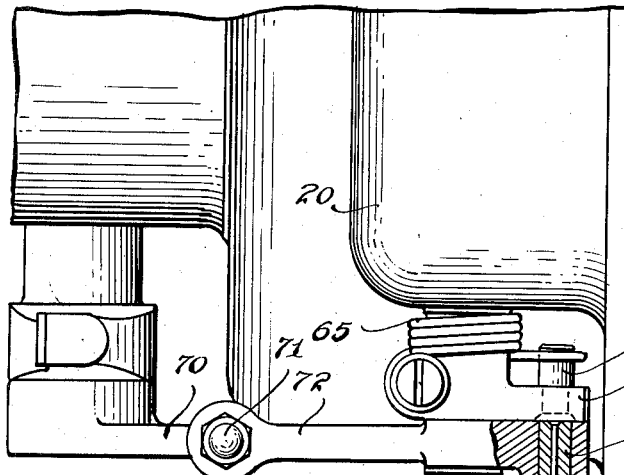
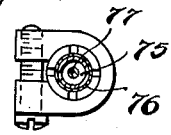
INVENTOR.
*ERNEST E. WEMP.*
BY *Barnes and Kisselle*
ATTORNEYS.

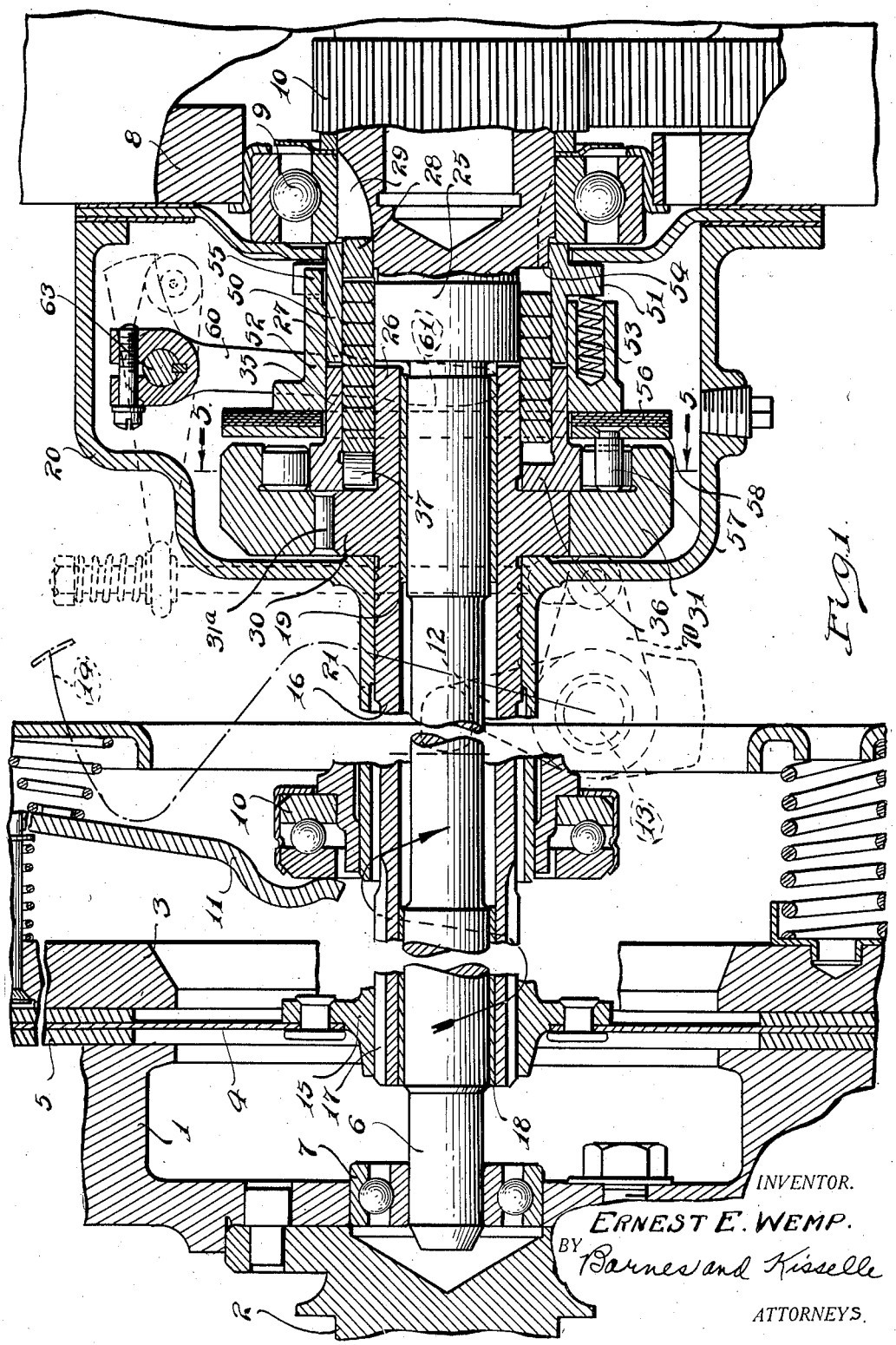

Dec. 18, 1934.                E. E. WEMP                1,985,126
                            DRIVING MECHANISM
                          Filed Nov. 5, 1931        3 Sheets Sheet 3
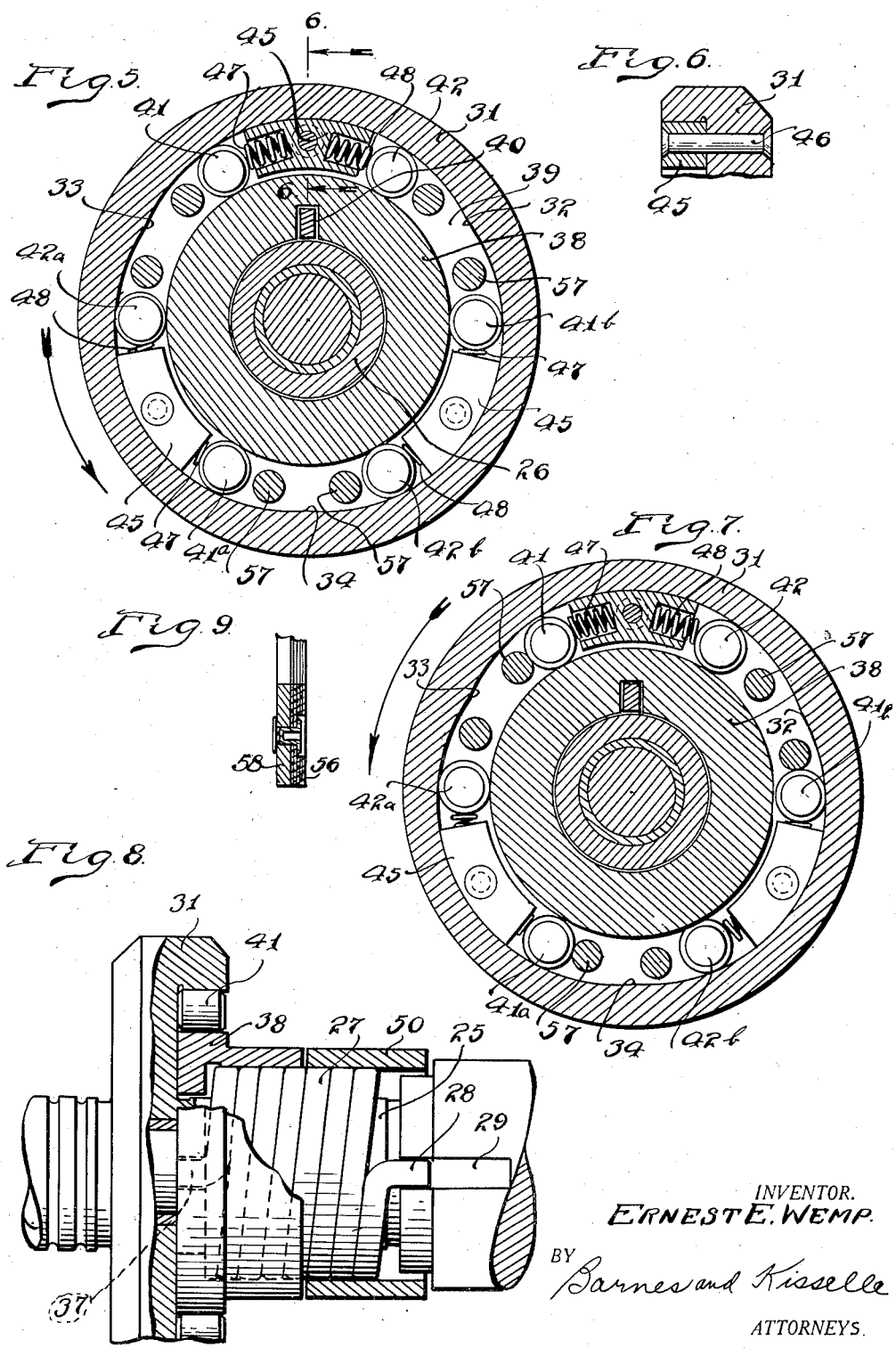
INVENTOR.
ERNEST E. WEMP.
BY Barnes and Kisselle
ATTORNEYS.

Patented Dec. 18, 1934

1,985,126

UNITED STATES PATENT OFFICE 1,985,126

DRIVING MECHANISM

Ernest E. Wemp, Detroit, Mich.

Application November 5, 1931, Serial No. 573,114

16 Claims. (Cl. 192—48)

This invention relates to transmitting driving power from driving mechanism to driven mechanism, wherein connecting means between the driving and driven parts are employed which provide for the overrunning of the driven part as regards its driving part. This overrunning action is employed in some automotive vehicles and when employed, the vehicles may be allowed to coast along at a relatively high rate of speed while the engine and associated driving parts are operating slowly, as for example, when the engine is idling with substantially closed throttle. This action has been termed "free wheeling".

One type of connection forming means for permitting this action is that of a coil spring which is arranged to contract and expand in accordance with the direction of applied torque to the end that its convolutions frictionally engage outside surfaces or inside surfaces, respectively, of the driving and driven parts. For example, the end convolutions of a coil spring may be frictionally engaged with driving and driven parts; when the torque is in one direction, the spring may be wound up or contracted around exterior surfaces of the driving and driven parts to grip the same and establish a drive connection. Reverse torque tends to unwind the spring, thus causing it to release the driving and driven members to the end that the driven member may overrun the driving member. The arrangement may be reversed so that when the torque is in one direction, a spring expands against the interior surfaces to establish the connection, and with reversed torque is contracted to disengage said surfaces and break the connection.

A coil spring clutch of this type provides a very effective connection as the same affords frictional contact of high torque capacity. In order to energize the spring into frictional engagement by its contraction or expansion, relative rotary movement must take place between its ends or end convolutions. When frictional contact of the end convolutions of the spring with driving and driven parts is relied upon for exerting the energizing tendency upon the spring, very close machining operations are necessary. The frictional engagement at the ends of the spring must be sufficient to initiate the winding up or expansion of the spring with torque in one direction, and yet this frictional engagement must permit of relative rotation between driving and driven parts when the driven part overruns the driving part. A substantial amount of friction at the end convolutions of the spring will prevent free overrunning action, and undue amount of friction may cause a heating up of the parts. Difficulties have been encountered in obtaining such accurate machining of the parts so as to afford sufficient frictional contact at the end convolutions of the spring without having too much friction.

The present invention is concerned with the provision of a construction wherein a coil spring type of clutch may be utilized for the purpose above specified, and wherein additional structural parts are employed for exerting sufficient torque on the spring to energize it into frictional engagement with driving and driven parts. This additional structural arrangement may be, and preferably is, controllable at will, to the end that the structure may be operated under a condition which will permit of the driven member overrunning the driving member, and under a condition in which the driving and driven members are tied together so that the driven member may not overrun the driving member. The additional structural arrangement which may be employed in combination with a coil spring may take the form of another clutch which in itself is capable of an overrunning action, and it may embody a clutch employing rollers operating in conjunction with opposed surfaces which are out of parallel, and in which the rollers are adapted to jam between the opposed surfaces thus establishing an operable driving connection. Where such a roller type of overrunning clutch is employed for the purpose specified, the control means may be such as to render the rollers or some of them, ineffective for establishing a drive connection at the will of the operator. Other objects of the invention will become more apparent as the detailed description progresses.

In the accompanying drawings:

Fig. 1 is a sectional view taken through an automotive clutch structure showing an arrangement embodying the present invention.

Fig. 2 is a side elevational view of a housing showing the control elements.

Fig. 3 is a top view of the housing illustrating some of the control parts in section.

Fig. 4 is a section taken on line 4—4 of Fig. 3.

Fig. 5 is a sectional view taken substantially on line 5—5 of Fig. 1 showing a roller clutch arrangement.

Fig. 6 is a section taken on line 6—6 of Fig. 5.

Fig. 7 is a view similar to Fig. 5 showing the relation of some of the parts when some of the rollers are rendered ineffective.

Fig. 8 is a view partly in section showing a coil spring and its mounting and including adjacent elements.

Fig. 9 is a sectional detail showing the structure of one of the control elements.

The invention is particularly adaptable for use in automotive vehicles, and the same is shown and described in such connection, but it will be appreciated that the invention may be employed for transmitting power in places other than automotive vehicles. In Fig. 1 the flywheel of an internal combustion engine is shown at 1, mounted upon the end of the engine crankshaft 2. Some of the clutch structure is shown, as for example, a clutch pressure plate 3, and a driven disc 4 which may have facing material 5 adapted to be packed between the pressure plate 3 and flywheel 1 to establish clutching engagement.

A driven shaft 6 may be piloted at one end in the flywheel as by means of a suitable bearing 7, and at its other end may extend into a gear shift housing 8 through a suitable bearing structure 9, the said end of which may be enlarged for carrying a toothed portion in the form of a gear as shown at 10.

The clutch constituted by flywheel 1, pressure plate 3, and driven disc 4 is capable of being engaged and disengaged at will, it being understood that the pressure plate 3 may be acted upon by clutch packing springs in a manner well known to those versed in the art. This clutch may be released by retracting the ring 3 out of engagement with the disc 4 for which purpose a reciprocable member 10 may act upon releasing levers 11, member 10 being reciprocable by yoke member 12 on clutch control shaft 13, which may be rocked counterclockwise when foot lever 14 is depressed. All these clutch releasing devices including the foot lever are well known to those versed in the art, and are not shown in detail herein; and especially the lever 14 is shown in diagrammatic form so as not to confuse the remaining structure which forms the basis of the invention.

The driven disc as shown, has a hub 15 mounted upon a sleeve member 16 as by means of a spline connection so that the sleeve is driven by the disc. The driven shaft 6 is journaled in this sleeve for which purpose bearings 18 and 19 may be employed. The sleeve 16 accordingly is a driven member as regards the clutch disc 4, but it becomes a driving member in its relation to the shaft 6, and it will be so termed in some of the places where it is hereinafter referred to.

A housing 20 may be supported by the transmission case 8 and project forwardly therefrom having an extension 21 which may enclose the sleeve 16. The driven shaft 6 may have a machined portion 25 forming an exterior gripping surface, and the sleeve 16 may have an end portion 26 also forming an exterior gripping surface and of substantially the same diameter as the portion 25. A coil spring 27 may be located over these two parts, and one end of the spring as at 28 may be secured to the driven shaft by having its end projecting as shown at Fig. 8 and situated in a milled slot 29. The other end of the spring is connected to the sleeve 16 indirectly through another clutch structure, one purpose of which is for energizing the spring so as to cause it to contract and establish a frictional engagement with parts 25 and 26 when the torque is in a direction from sleeve 16 to the driven shaft 6.

The sleeve 16 may have a flange 30 over which there may be placed a ringlike member 31, and these two members may be secured together by a number of rivets 31a which may be taken through the dividing line between the two parts. The member 31 extends axially at its outer rim, with the inner wall of the axially extending portion providing an interior gripping surface which may be shaped to effect a wedging action on clutch rollers. This is shown in Fig. 5 wherein the said interior surface is shown as having high points 32, 33 and 34 equally spaced apart. A sleeve member 35 is located over a portion of the spring 27 and it has an inwardly extending flange 36 which has an aperture 40 (Fig. 5) for receiving the outwardly extending end 37 of the spring. This sleeve 35 has a portion 38 which underlies the extending rim of member 31; the result is that part 38 and part 31 have opposed surfaces forming an annular channel 39, bounded on one side by the irregular surface having the high points, and on the other side by the part 38 the surface of which is circular. Sets of clutch rollers are arranged in the channel 39, one set comprising rollers 41, 41a, 41b, and the other set comprising rollers 42, 42a, 42b. Carried by the member 31, and positioned in the channel 39 are blocks 45 each of which may be secured to the member 31 as by a rivet or the like 46. Coil springs are packed up by these blocks and arranged to engage the rollers, such coil springs being shown at 47 and 48 and the same may be confined in recesses in the blocks as shown.

Diverting from the description, let the function of the parts just described be related. Assume that the member 31 starts rotating in a counterclockwise direction as Fig. 5 is viewed and as indicated by the arrow. At this time the rollers 41, 41a, 41b are ineffective. The springs 48 hold the rollers 42, 42a, 42b tightly against the inner and outer walls of the channel which is decreasing in width. These rollers then tend to take hold with a jamming action and establish driving relation between parts 31 and 38. Now assuming that the driven member 38 tends to overrun the member 31, the jamming action of rollers 42, 42a, 42b becomes ineffective, and at this time rollers 41, 41a, 41b effect the driving connection to the end that member 38 may drive member 31. This last mentioned condition may be more clearly understood if it be assumed that member 31 starts to rotate in a clockwise direction, in which rollers 41, 41a, 41b establish driving connection precisely as they do when member 38 tends to overrun member 31. The parts may be operated when functioning in the above described manner.

When the engine starts to pick up the load the rollers 42, 42a, 42b impart rotation to the sleeve 35; this sleeve being connected to the one end of the spring, energizes it, or in other words, causes it to contract around the members 25 and 26. The spring now functions for establishing a driving connection between driving sleeve 16 and driven shaft 6, with no driving effort or substantially no driving effort being communicated through the roller clutch. In the event the driven shaft tends to overrun the driving sleeve, the spring will expand and tend to rotate sleeve 35 faster than part 31, at which time rollers 41, 41a, 41b come into play and prevent such overrunning action.

Means are provided, however, for rendering the overrunning action possible. Positioned over part of the spring is a sleeve 50, which with sleeve 35, serves to limit the expansion of the spring and which may carry a suitable number of bosses 51. An axially shiftable member 52 is located over the sleeves 35 and 50 having recessed bosses for confining each a coil spring 53 backed up by the bosses 51. The sleeve 50 has a part lying in a milled slot in the driven shaft as at 54, and this sleeve and sleeve 52 are locked together by interengaging parts shown at 55 so that both rotate with the driven shaft. A ring 58 may have friction facing material 56, and to this ring are attached studs 57 which engage against the member 31 in the bottom of the circular channel 39. The springs 53 urge the sleeve 52 into frictional engagement with the material 56. The studs 57 are designed for cooperation with the clutch rollers in the channel and to this end there may be a stud 57 for each roller as shown in Fig. 5.

The facing material 56 has a diameter greater than that of sleeve 52 and a member such as a yoke 60 has the ends of its arms suitably shaped as at 61 for engaging the facing material 56 beyond the peripheral edge of the sleeve 52. This yoke is mounted upon an operating shaft 63. The shaft 63 extends outside the housing 20 as shown in Figs. 2 and 3, and fixed to the same outside the housing is a member having an arm 64. Means such as a coil spring 65 having one end engaging over stud 66 carried by said arm and the other in engagement with a fixed abutment on the housing as at 67 normally holds the shaft 63 under a clockwise rotating tension. This serves to move the yoke 60 and causes its portions 61 to engage the friction material 56.

Means are provided for rocking the shaft 63 against the action of spring 65 for causing the arms 60 to disengage the facing 56. For this purpose the clutch operating shaft 13 may have an arm 70 connected to a link 71 which passes through an aperture in a rocker arm 72, having a fixed abutment 73 on one side thereof and engaging therewith on the other side as by means of a coil spring 74. The rocker arm 72 may pivot on the shaft 63. The rocker arm may have a hollow portion for the reception of a plunger 75 axially reciprocable through means such as a Bowden wire, comprising a hollow flexible cable 76 and wire 77 connected to the plunger. In normal position of the parts with the spring 65 exerting its normal action upon the rocker shaft 63, the plunger 75 is in a position to engage a side of arm 64. The Bowden wire may be extended to a suitable location for control by the operator and by a push or a pull action, the plunger 75 may be retracted into its housing or extended at certain times to cooperate with the arm 64 as will be now described.

With the parts in position shown in Fig. 2 the spring 65 is effective and holds the yoke 60 against the facing material 56. If the clutch lever be now depressed to disengage the clutch, the parts 70 and 71 rock the rocker arm 72 clockwise as Fig. 2 is viewed and the end of the rocker arm carrying the plunger 75 moves to a position so that the plunger underlies the lower face of arm 64. The operator may now, through the means of the Bowden wire eject the plunger 75 causing it to slide in under the arm 64; upon reengagement of the clutch, the clutch packing springs rock shaft 13 and rocker arm 72 shifting it back to its normal position. In so doing the plunger 75 engages arm 64 and rocks the same together with the shaft 63 against the action of the spring 65. This disengages the yoke arms from the friction material 56. This is the position of the parts as illustrated in Fig. 1. The plunger may be retracted at any time with or without release of the clutch for permitting the yoke arms to engage the friction material 56.

Reverting now to the operation: it will be assumed that the engine starts to drive the driven parts. Rollers 42, 42a, 42b, as above described, establish the driving connection between parts 31 and 38. This rotary movement of the part 38 effects a contraction of the spring. It will be appreciated that while the spring is contracting the part 38 may rotate while the shaft 6 remains yet unmoved as some relative movement is required to wind up the spring. Thus the shaft 6 lags behind. Likewise sleeve 50 and sleeve 52 lag behind as they move with the shaft 6. The frictional engagement between sleeve 52 and facing 56 effects a lag in the ring 58 and studs 57 carried thereby. Accordingly, parts 31 and 38 including the blocks 45 and rollers begin rotary movement, but the studs 57 may not on account of the lost motion or lag. Rollers 41, 41a, 41b move into engagement with the studs adjacent them and the studs effect shifting of these rollers by compressing the respective springs, thus rendering the rollers loose in the channel 39 and ineffective, whereas the rollers which are driving at this time, namely, 42, 42a, 42b move away from their adjacent studs. This relation of the parts is depicted in Fig. 7.

If the shaft 6 tends to overrun or drive the driving parts, the shaft and the studs 57, through the connecting means above described rotate for an instant faster than parts 31 and 38. This occurs while the spring 27 is expanding. Accordingly, the studs which are holding the rollers 41, 41a, 41b ineffective, move away therefrom rendering these rollers effective, and the studs adjacent rollers 42, 42a, 42b move into contact with them and render them ineffective by a compression of their respective springs. Thus the member 38 may drive member 31 through the means of the clutch rollers 41, 41a, 41b. It will be noted at this time that spring 27 expands against the sleeves surrounding the same so that it frictionally engages the same and its expansion is limited. This frictional engagement serves to establish a connection between the driven shaft and the part 35. It will be appreciated that as above described, there is no overrunning action as one set of clutch rollers are effective when the torque is in one direction and the other set of rollers is effective with the torque in the other direction.

If the free wheeling action is desired, then the arms of the yoke 60 are permitted to engage the facing 56 for exerting a controlling action upon the studs 57. With the parts in motion let it be assumed that the driven shaft 6 tends to overrun; for an instant it turns faster than the driving parts, unwinding the spring, and in so doing as above described, the frictional engagement between the sleeve 52 and material 56 tends to shift the studs and render the rollers 41, 41a, 41b effective as above described. The yoke 60, however, exerts a braking tendency against this increased rotation of the ring 58, and exerts its action on the facing material over the action of the sleeve 52. Accordingly, the studs carried by the ring are not shifted out of the position shown in Fig. 7, but are held in such position, and slippage occurs between sleeve 52 and facing material 56. Accordingly, the driven shaft 6, the spring, the sleeves 50 and 35, may rotate faster or overrun part 31, the driving sleeve 16 and all other driving parts. However, the rollers 42, 42a, 42b are in position to effect clutching action as soon as the torque reverses. If the yoke is in contact with the facing 56 when the vehicle is being started, the function of rendering rollers 41, 41a, 41b ineffective is the same as that heretofore described as the yoke and sleeve 52, then work together in effecting a lag in the rotation of the ring 58.

The ease by means of which the operator may shift from free wheeling action to positive drive action is apparent. In order to shift from positive or conventional drive to free wheeling the Bowden wire need merely be pulled to retract the plunger 75 whereupon the yoke 60 automatically comes into play. As soon as the yoke 60 frictionally engages the material 56, the same is decelerated or rotated relative to the clutch rollers which immediately render rollers 41, 41a, 41b, ineffective, if they are not already ineffective. To reestablish conventional drive, the clutch pedal may be depressed, the plunger 75 projected from the socket by the Bowden wire and then the clutch reengaged.

Extreme accuracy in the machining of the spring convolutions and the surfaces which they engage is not required for effecting energization of the spring into clutching engagement. This is accomplished entirely by the roller clutch.

I claim:

1. The combination of a driving member, a driven member, a coil spring having one end positively connected to one member to rotate therewith, a clutch having a driving part rotating directly with said driving member and having a driven part with clutching elements interposed between said parts, the other end of the spring being positively connected to the driven part of said clutch, said intermediate clutching elements including elements for establishing a drive connection from clutch driving part to clutch driven part, and elements for establishing a drive connection from driven part to driving part, and means for rendering the last named elements ineffective.

2. The combination of a driving member, a driven member, a coil spring adapted to establish a driving connection between said members, one end of the spring being connected to one of said members, a roller type clutch connecting the other end of the spring with said other member having rollers effective for establishing clutching engagement when the torque is from driving member to driven member and rollers for effecting clutching engagement when the torque is reversed, and means for rendering the second named rollers ineffective.

3. The combination of a driving member, a driven member, a coil spring associated with these members and arranged to contract when the torque is in one direction and expand when the torque is in the other direction whereby its convolutions frictionally engage the driving and driven members to establish a driving connection between them when the torque is in one direction, a roller type clutch having two sets of rollers, one set for establishing clutching engagement when the torque is in one direction and one set for establishing a clutching engagement when the torque is reversed, said clutch connecting one end of the spring with one of said members, and means controllable at will for rendering one set of rollers ineffective when the torque is in the direction such that said set of rollers would normally effect clutching engagement.

4. A power transmitting construction comprising in combination, a driving member having a clutch driving part, a clutch driven part, clutching elements associated with said clutch parts, some for establishing a drive connection when the torque is in one direction and some for establishing a driven connection when the torque is reversed, a driven member, means connecting said driven member and the clutch driven part adapted to permit the driving member to lag behind the driven member in event the driven member tends to overrun the driving member, and means operable by relative movement of driven member and driving member incident to said lag for rendering the clutching elements which establish a drive connection when the torque is from driven member to driving member ineffective.

5. A power transmitting device comprising in combination, a driving member having a clutch driving part, a clutch driven part, clutching elements associated with said parts, some for establishing a drive connection when the torque is in one direction and some for establishing a drive connection when the torque is reversed, a driven member, means connecting the driven member and clutch driven part adapted to permit the driven member to lag behind the clutch driven part when the torque is from the clutch driving part to the driven member and for permitting the clutch driven part to lag behind said driven member upon torque reversal, means operable by the relative movement between the driven member and clutch driven part for rendering some of the clutching elements ineffective when the torque is in one direction and for rendering other of such elements ineffective upon reversed torque, and means controllable at will for preventing the operation of said means operable by said relative movement when the torque is from driven member to the clutch driven part.

6. A power transmitting device comprising in combination, a driving member having a clutch driving part, a clutch driven part, two sets of rollers operating in cam grooves, one set for establishing a drive connection between the clutch parts when the torque is from driving clutch part to driven clutch part and one set for establishing a driving connection upon torque reversal, a driven member, means for connecting the driven member and clutch driven part arranged to permit either to lag behind the other upon torque reversal, means operable upon relative rotation between said driven member and clutch driven part incident to the lag for rendering one set of rollers ineffective when the torque is in one direction and the other set of rollers ineffective when the torque is reversed, and means controllable at will for preventing operation of the next preceding means when the clutch driven part lags behind said driven member whereby said driven member may overrun said driving member.

7. A power transmitting device comprising in combination a driving member having a clutch driving part, a clutch driven part, two sets of rollers operating in cam grooves, one set for establishing a drive connection between the clutch parts when the torque is from driving clutch part to driven clutch part, and one set for establishing a driving connection upon torque reversal, a driven member, means for connecting the driven member and clutch driven part arranged to permit either to lag behind the other upon torque reversal, means operable upon relative rotation between said driven member and clutch driven part incident to the lag for rendering one set of rollers ineffective when the torque is in one direction and the other set of rollers ineffective when the torque is reversed, and means controllable at will for preventing operation of the next preceding means when the clutch driven part lags behind said driven member whereby said driven member, said clutch driven part and the means connecting them may overrun said driving member.

8. The combination of a driving member having a clutch driving part, a clutch driven part, said clutch parts cooperating to form a circumferential groove, some of the walls of which are out of parallel to form cam faces, one set of rollers in the groove for establishing drive connection when the torque is from driving to driven part, a second set of rollers in the groove for establishing a driving connection when the torque is reversed, a driven member, means connecting the clutch driven part and driven member arranged to permit relative rotation or lag between them upon torque reversal, means operable incident to the lag for rendering the second set of rollers ineffective when the torque is from driving part of the clutch to driven part of the clutch and operable for rendering said second set of rollers effective when the torque is reversed, and means controllable at will for preventing operation of the next preceding means when the torque reverses, whereby said second set of rollers are maintained ineffective so that said driven member may overrun the driving member.

9. The combination of a driving member having a clutch driving part, a clutch driven part, said clutch parts cooperating to form a circumferential groove, some of the walls of which are out of parallel to form cam faces, one set of rollers in the groove for establishing drive connection when the torque is from driving to driven part, a second set of rollers in the groove for establishing a driving connection when the torque is reversed, a driven member, a coil spring connecting the driven member and clutch driven part adapted to expand and contract in accordance with the direction of applied torque to permit relative rotation or lag between them upon torque reversal, means operable incident to the lag for rendering the second set of rollers ineffective when the torque is from driving part of the clutch to driven part of the clutch and operable for rendering said second set of rollers effective when the torque is reversed, and means controllable at will for preventing operation of the next preceding means when the torque reverses whereby said second set of rollers are maintained ineffective so that said driven member may overrun the driving member.

10. The combination of a driving member, a driven member, each having a gripping surface, a coil spring arranged to contract around said gripping surfaces under torque for establishing a drive connection between said members, one end of the spring being connected to the driven member, a sleeve over a portion of the spring to which its other end is connected, said sleeve and driving member providing a circumferential groove with cam walls, a set of rollers in the groove for establishing a drive connection with torque in one direction and another set of rollers in the groove for establishing a drive connection upon torque reversal, means projecting into said groove, means connected to the driven member to move directly therewith, a friction connection between said last two mentioned means, said spring permitting relative movement between the clutch driven part and driven member upon torque reversal, the said means which is connected to rotate with the driven member operating through the friction connection to shift the said means projecting into the groove whereby one set of rollers or the other may be rendered ineffective in accordance with the direction of applied torque, and other friction means controllable at will for frictionally engaging the means projecting into the groove for preventing the same from being operated by the said means which is connected to the driven member to rotate therewith when the torque direction is from driven member to driving member.

11. The combination of a driving member having a clutch driving part, a clutch driven part cooperating with the driving part to form a circumferential groove with cam shaped walls, two sets of clutch rollers in the groove one for clutching with torque in the one direction and the other for clutching with reversed torque, a driven member having an exterior gripping surface, said driven clutch part member having an exterior gripping surface, a coil spring surrounding said surfaces, one end of the spring being connected to the driven member and the other end of the spring being connected to the clutch driven part, said clutch driven part being in the form of a sleeve surrounding part of the spring, another sleeve surrounding part of the spring and connected to the driven member, a collar surrounding said sleeves, a ring having studs projecting into the circumferential groove, spring means for urging the collar into frictional engagement with the ring, means connecting the collar to rotate with a driven member, said coil spring permitting lag between the driven member and clutch driven part upon torque reversal whereby said collar exerts frictional tendency on the ring to rotate the same relative to the rollers in the groove, and means controllable at will for frictionally engaging the ring and exerting frictional tendency thereon greater than the frictional tendency of the collar whereby to render the frictional tendency of the collar on the ring ineffective.

12. The combination of a driving member, a driven member, a coil spring arranged to frictionally grip the members with its convolutions and establish a drive connection therebetween when said coil spring is subjected to torque for varying its normal diameter, one end of the spring being directly connected to one of the members, a clutch having a driving part connected to the other of said members and having a driven part, the other end of the spring being connected to the said driven part of the clutch, elements for establishing a drive connection between the clutch driving and clutch driven part when the torque is from driving part to driven part whereby to energize the spring into frictional engagement with the driving and driven members, and for establishing a driving connection when the torque is from driven member to driving member, and means controllable at will for rendering said elements ineffective for establishing the driving connection between the clutch driving part and the clutch driven part when the torque is in a direction from the driven part to the driving part whereby the driven member may overrun the driving member.

13. The combination of a driving member, a driven member, a coil spring arranged to frictionally grip the members with its convolutions and establish a drive connection therebetween when said coil spring is subjected to torque for varying its normal diameter, one end of the spring being directly connected to one of the members, a clutch having a driving part connected to the other of said members and having a driven part, the other end of the spring being connected to the said driven part of the clutch, means for establishing a driving connection between the clutch driving part and clutch driven part whereby torque may be transmitted to the spring and energize the same into frictional engagement with the driving and driven members, said driving and driven members having relative rotational movement during the energizing of the spring, and means controllable at will and operable incident to the action of the relative rotational movement between the driving member and driven member for breaking the driving connection between the driving clutch part and driven clutch part when the torque is in a direction from the driven member to the driving member.

14. The combination of a driving member, a driven member, a coil spring arranged to frictionally grip the members with its convolutions and establish a drive connection therebetween when said coil spring is subjected to torque for varying its normal diameter, one end of the spring being directly connected to one of the members, a clutch having a driving part connected to the other of said members and having a driven part, the other end of the spring being connected to the said driven part of the clutch, elements for establishing a drive connection between the clutch driving member and clutch driven part, and means controllable at will for rendering some of said elements ineffective when the torque is in a direction from the driven member to the driving member.

15. The combination of a driving member, a driven member, said members having engageable surfaces, a coil spring adapted to be varied in over-all diameter and having its convolutions positioned adjacent the said surfaces whereby the convolutions may grip the members and effect a drive connection between the driving member and driven member, one end of the spring being positively connected with one member to rotate therewith, a clutch having a driving part connected directly to one of the members, said clutch having a driven part, clutching elements, for operatively connecting the driving and driven parts, and the opposite end of the coil spring being positively connected to the driven part of the clutch, said coil spring establishing a drive connection from driving member to driven member with the torque in one direction and from the driven member to the driven part of the clutch when the torque is reversed, and controllable means for rendering some of the clutching elements ineffective when the torque is in a direction from the driven member to the driving member whereby the driven member may overrun the driving member.

16. The combination of a rotary driving member, a rotary driven member, a driving clutch part connected to the driving member, a driven clutch part connected to the driven member, a set of roller elements for establishing a driving connection between the clutch parts when the torque is from the driving member to the driven member, a second set of roller elements for establishing a driving connection between the clutch parts when the torque is from the driven member to the driving member, means shiftable automatically with respect to the roller elements upon a change of the torque from the driving member to the driven member and vice versa for rendering the said second set of roller elements ineffective when the torque is from the driving member to the driven member but which become effective when the torque comes from the driven member, and means controllable at will for acting upon said automatically shiftable means to prevent shift thereof when the torque comes from the driven member whereby the driven member may overrun the driving member.

ERNEST E. WEMP.